United States Patent
Kitamura et al.

(10) Patent No.: US 9,686,430 B2
(45) Date of Patent: Jun. 20, 2017

(54) IMAGE READER, AND IMAGE FORMING APPARATUS

(71) Applicant: FUJI XEROX CO., LTD., Tokyo (JP)

(72) Inventors: Tomoaki Kitamura, Kanagawa (JP); Yuichi Mikuni, Kanagawa (JP); Youji Nishida, Kanagawa (JP); Shusaku Yokota, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 5 days.

(21) Appl. No.: 14/470,122

(22) Filed: Aug. 27, 2014

(65) Prior Publication Data

US 2015/0281485 A1     Oct. 1, 2015

(30) Foreign Application Priority Data

Mar. 25, 2014  (JP) ................................ 2014-062450

(51) Int. Cl.
    *H04N 1/04*     (2006.01)
    *H04N 1/00*     (2006.01)
    *H04N 1/024*    (2006.01)

(52) U.S. Cl.
    CPC ..... *H04N 1/00557* (2013.01); *H04N 1/02409* (2013.01)

(58) Field of Classification Search
    CPC ................................................. H04N 1/00557
    USPC ............... 358/497, 494, 474, 483, 482, 505, 358/512–514; 250/234–236, 239; 399/211, 212
    See application file for complete search history.

(56) References Cited

U.S. PATENT DOCUMENTS

| | | | | |
|---|---|---|---|---|
| 5,281,803 A | * | 1/1994 | Ishizuka | H04N 1/00976 250/208.1 |
| 5,803,622 A | * | 9/1998 | Mama | B41J 2/471 347/257 |
| 5,900,622 A | * | 5/1999 | Ogura | H04N 1/0316 250/208.1 |
| 6,246,591 B1 | * | 6/2001 | Ikeda | B41J 29/00 174/72 A |
| 6,384,393 B2 | * | 5/2002 | Takami | H01L 27/14618 250/208.1 |
| 6,641,040 B2 | * | 11/2003 | Inage | G06K 7/10643 235/454 |
| 6,717,702 B1 | * | 4/2004 | Yamauchi | H04N 1/00519 358/471 |
| 6,975,436 B2 | * | 12/2005 | Saito | H04N 1/00519 358/483 |
| 7,095,532 B2 | * | 8/2006 | Chang | H04N 1/1017 174/117 FF |
| 7,116,451 B2 | * | 10/2006 | Chang | H04N 1/00533 174/117 FF |
| 7,384,301 B2 | * | 6/2008 | Liu | H04N 1/0083 439/162 |

(Continued)

FOREIGN PATENT DOCUMENTS

JP    A-09-321925     12/1997
JP    2005057628 A  *  3/2005

*Primary Examiner* — Cheukfan Lee
(74) *Attorney, Agent, or Firm* — Oliff PLC

(57) ABSTRACT

Provided is an image reader including a substrate that includes a photoelectric conversion element which is disposed to face an imaging lens, a folded wire that has one end connected to the substrate, and a conductive inclination section that is inclined with respect to an up-down direction of the substrate and grounds a folded portion of the wire.

23 Claims, 4 Drawing Sheets

(56) References Cited

U.S. PATENT DOCUMENTS

| | | | | |
|---|---|---|---|---|
| 7,817,313 | B2* | 10/2010 | Mikajiri | H04N 1/00885 358/474 |
| 7,969,621 | B2* | 6/2011 | Shunji | H04N 1/00519 271/109 |
| 8,159,726 | B2* | 4/2012 | Inage | H04N 1/401 358/406 |
| 9,049,327 | B2* | 6/2015 | Xu | H04N 1/0083 |
| 2002/0171880 | A1* | 11/2002 | Yui | H04N 1/00976 358/505 |
| 2003/0179390 | A1* | 9/2003 | Kitozaki | G03G 15/6538 358/1.6 |
| 2004/0251438 | A1* | 12/2004 | Iwakiri | G03G 15/045 250/591 |
| 2007/0285478 | A1* | 12/2007 | Samoto | B41J 2/17509 347/85 |
| 2009/0278632 | A1* | 11/2009 | Hombo | H04N 1/00994 333/24 R |
| 2010/0027080 | A1* | 2/2010 | Hombo | H04N 1/00549 358/474 |
| 2010/0231979 | A1* | 9/2010 | Nagase | G06T 5/002 358/3.26 |
| 2011/0095168 | A1* | 4/2011 | Kim | H01L 27/14806 250/208.1 |
| 2012/0250057 | A1* | 10/2012 | Miyanagi | G03G 15/60 358/1.13 |
| 2013/0242513 | A1* | 9/2013 | Masuda | H05K 1/0218 361/749 |
| 2015/0331381 | A1* | 11/2015 | Kobayashi | H04N 1/00 358/1.13 |

\* cited by examiner

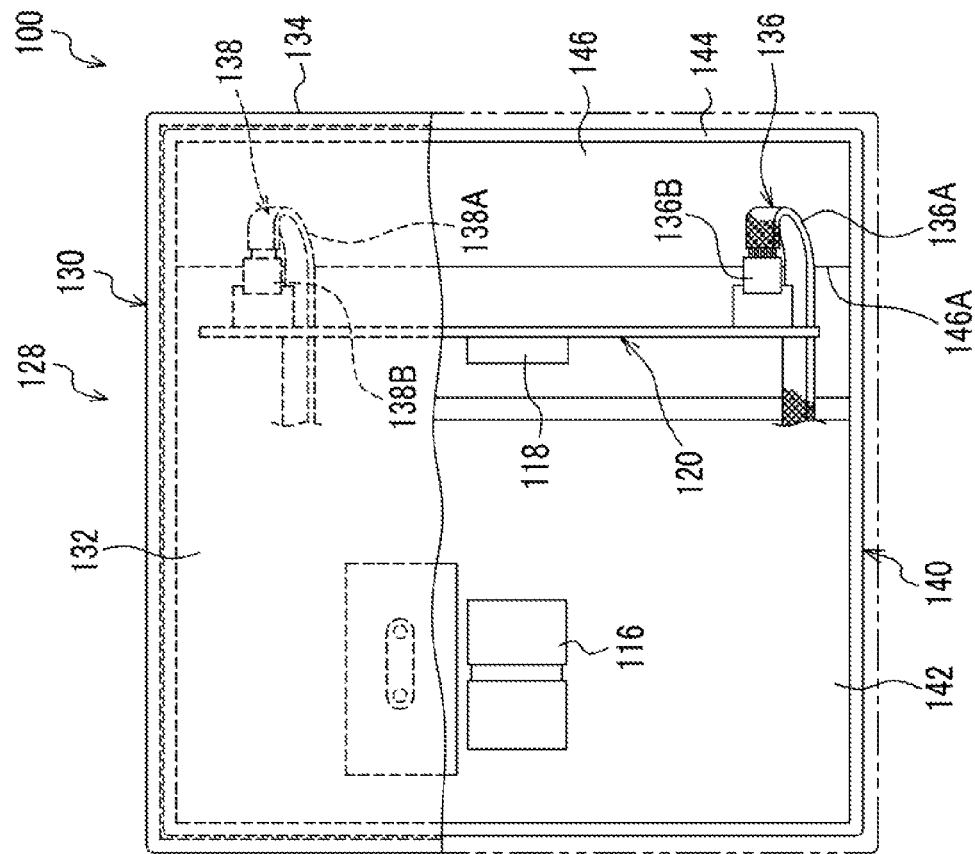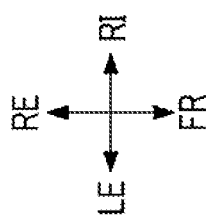

IMAGE READER, AND IMAGE FORMING APPARATUS

CROSS-REFERENCE TO RELATED APPLICATIONS

This application is based on and claims priority under 35 USC 119 from Japanese Patent Application No. 2014-062450 filed Mar. 25, 2014.

BACKGROUND

Technical Field

The present invention relates to an image reader, and an image forming apparatus.

SUMMARY

According to an aspect of the invention, there is provided an image reader including:

a substrate that includes a photoelectric conversion element which is disposed to face an imaging lens;

a folded wire that has one end connected to the substrate; and a conductive inclination section that is inclined with respect to an up-down direction of the substrate and grounds a folded portion of the wire.

BRIEF DESCRIPTION OF THE DRAWINGS

Exemplary embodiments of the present invention will be described in detail based on the following figures, wherein:

FIG. 3 is a top plan view illustrating main sections of the image reader; and

DETAILED DESCRIPTION

Figure 1:
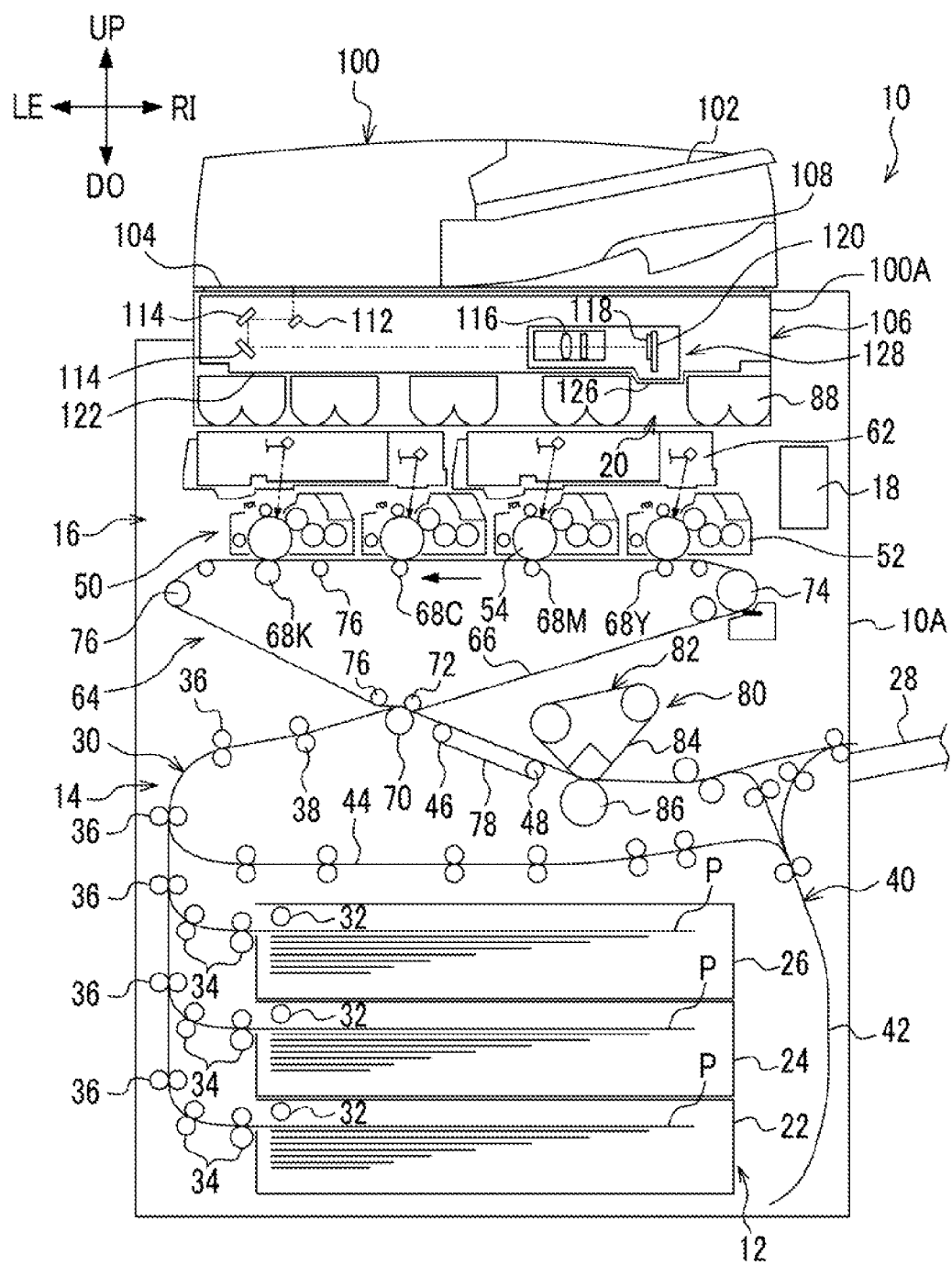
FIG. 1 is a front view illustrating a configuration of the entirety of an image forming apparatus having an image reader.

Hereinafter, exemplary embodiments of the present invention will be described in detail with reference to the accompanying drawings. As shown in FIG. 1, in the front view of an image forming apparatus 10, an arrow RI indicates the rightward direction, an arrow LE indicates the leftward direction, an arrow UP indicates the upward direction, and an arrow DO indicates the downward direction. Further, as shown in FIG. 3, in the plan view of an image reader 100, an arrow FR indicates the forward direction, and an arrow RE indicates the backward direction. Furthermore, in the following description, upstream in a recording medium (sheet of printing paper P) in a transport direction may be simply referred to as "upstream", and downstream in the recording medium (sheet of printing paper P) in the transport direction may be simply referred to as "downstream".

As shown in FIG. 1, the image forming apparatus 10 includes as image forming apparatus body 10A as a housing formed of plural frame members and panel members. In addition, a sheet containing section 12, which contains sheets of printing paper P as an example of a recording medium, is disposed on the lower side of the image forming apparatus body 10A. A transport section 14, which transports the sheets of printing paper P to a main operation section 16 to be described later, is disposed on the upper side of the sheet containing section 12.

The main operation section 16, which forms an image on the sheet of printing paper P supplied from the sheet containing section 12, is disposed on the upper side of the transport section 14. The image reader 100, which reads an original document (not shown in the drawing), is disposed on the upper side of the main operation section 16. Further, the main operation section 16 is provided with a control section 18 which controls operations of the respective sections of the image forming apparatus 10 and the image reader 100.

The sheet containing section 12 includes a first containing section 22, a second containing section 24, and a third containing section 26 that respectively contain the sheets of printing paper P of which the sizes are different. In addition, the transport section 14 includes delivery rollers 32, feed rollers 34 and 36, and a registration roller 38 that transport the sheets of printing paper P which are respectively contained in the first containing section 22, the second containing section 24, and the third containing section 26, and of which the sizes are different.

As described in detail, the delivery rollers 32, which deliver the contained sheets of printing paper P one by one, are respectively disposed on the left side upper end of the first containing section 22, the second containing section 24, and the third containing section 26. The feed rollers 34, which feed the delivered sheets of printing paper P to a transport path 30 of the transport section 14, are respectively disposed on the downstream of the delivery rollers 32.

In the transport path 30 on the downstream of the feed rollers 34, the feed rollers 36, which transport the sheets of printing paper P one by one, are disposed. The sheets of printing paper P are temporarily stopped downstream of the feed rollers 36, and the sheets of printing paper P are delivered to a secondary image transfer position to be described later at predetermined timing, and the registration roller 38, which aligns the transfer positions of images, is disposed.

Downstream of a fixing device 80 to be described later and upstream of a sheet discharge section 28 in the transport path 30, a duplex transport path 40 is connected to the transport path 30. The duplex transport path 40 transports and reverses the sheet of printing paper P when an image is formed on the rear surface of the sheet of printing paper P. In addition, between the transport path 30 and the duplex transport path 40, a feeding member (not shown in the drawing) is provided. The feeding member is for feeding the sheet of printing paper P from the transport path 30 to the duplex transport path 40.

The duplex transport path 40 is formed to be linear toward the lower side in the front view of the image forming apparatus 10, and includes a sheet-reversing section 42 that temporarily reserves the sheet of printing paper P having the front surface on which images are formed. The duplex transport path 40 is formed to be substantially linear toward the left side from the right side, and includes a supply path 44 that resupplies the sheet of printing paper P, which is reserved in the sheet-reversing section 42, to the feed roller 36. An image is transferred onto the rear surface of the sheet of printing paper P, which is resent to the feed roller 36 through the supply path 44, at a secondary image transfer position to be described later.

Figure 2:
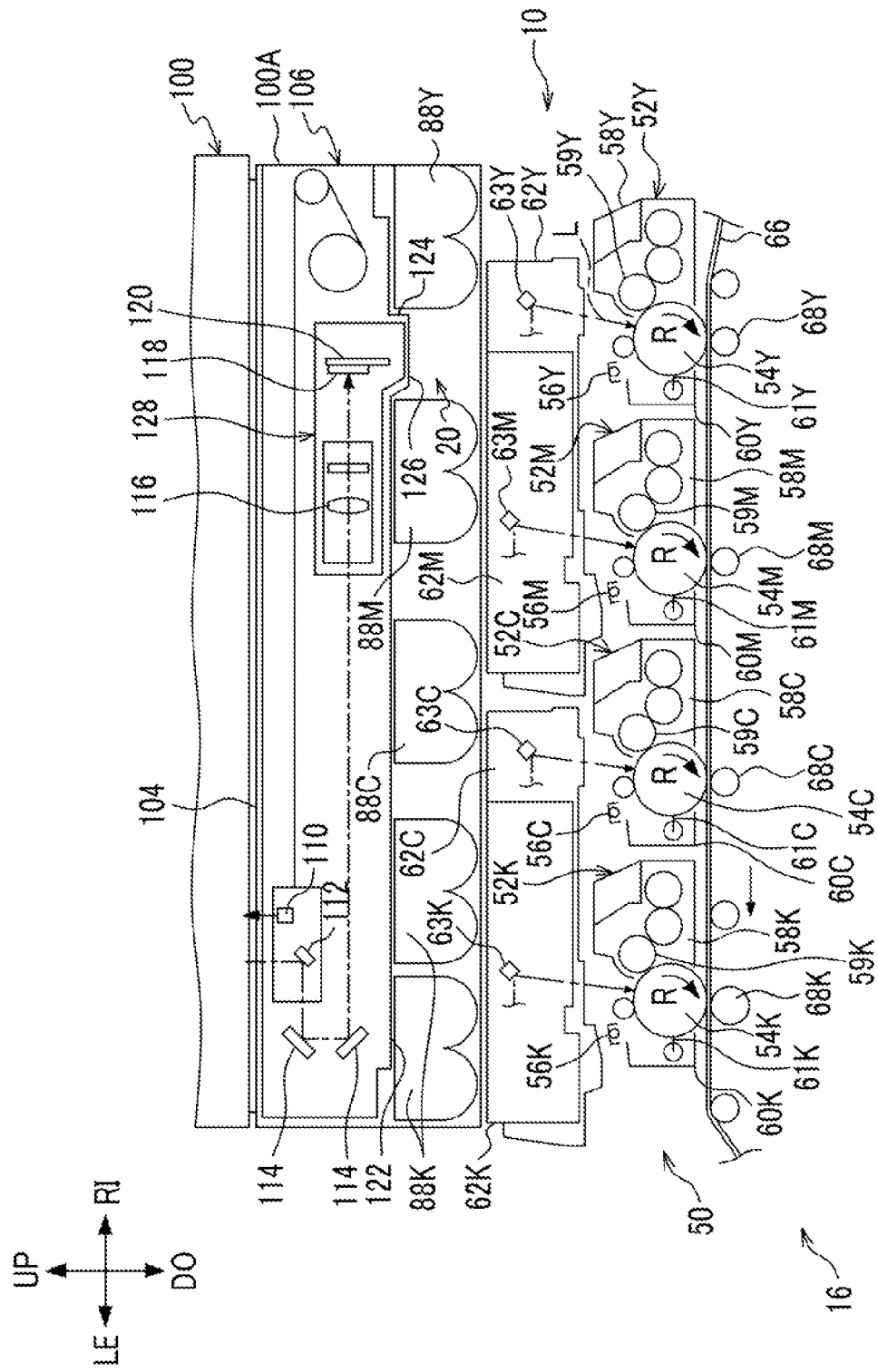
FIG. 2 is a front view illustrating a part of the image forming apparatus having the image reader in an enlarged manner.

As shown in FIGS. 1 and 2, the main operation section 16 includes: an image forming section 50 that forms a toner image on the sheet of printing paper P; and the fixing device 80 that fixes the toner image, which is formed on the sheet of printing paper P by the image forming section 50, onto the sheet of printing paper P by heat and pressure.

The image forming section 50 includes: image forming units 52Y, 52M, 52C, and 52K that have image holding members 54Y, 54M, 54C, and 54K corresponding to yellow (Y), magenta (M), cyan (C), and black (K) toners; exposure units 62Y, 62M, 62C, and 62K that irradiate the outer circumferential surfaces of the image holding members 54Y, 54M, 54C, and 54K with light beams L and expose the outer circumferential surfaces; and a transfer unit 64 that transfers the toner images, which are formed on the outer circumferential surfaces of the image holding members 54Y, 54M, 54C, and 54K, onto the sheet of printing paper P.

In the following description, when it is necessary to specifically describe the colors of yellow (Y), magenta (M), cyan (C), and black (K), any alphabetical character of Y, M, C, and K is attached at the end of the reference numeral. Further, with the same configuration, when it is not necessary to specifically describe Y, M, C, and K, the description will be given with the alphabetical characters of Y, M, C, and K after the reference numerals omitted.

The image forming unit 52 includes a cylindrical image holding member 54 that is formed to be rotatable in an arrow R direction (clockwise rotation direction shown in the drawing) through driving of a motor (not shown in the drawing) when the longitudinal direction is set as a shaft direction. The image forming unit 52 also includes a charging unit 56, a developing unit 58, and a cleaning device 60 that face the outer circumferential surface of the image holding member 54 and that are arranged in order from upstream to downstream in the rotation direction.

The exposure unit 62 is configured to scan the light beams L, which are emitted from a light source (not shown in the drawing), with a rotatable multi-faceted mirror (polygonal mirror), to reflect the light beam L with plural optical components including a reflecting mirror 63, and to irradiate the outer circumferential surface of the image holding member 54. In addition, the image holding member 54 is disposed under the exposure unit 62.

The outer circumferential surface of the image holding member 54 between the charging unit 56 and the developing unit 58 is irradiated with the light beam L which is emitted from the exposure unit 62. In addition, an intermediate image transfer belt 66 to be described later is in contact with the outer circumferential surface of the image holding member 54 between the developing unit 58 and the cleaning device 60.

The charging unit 56 is configured as, for example, a corotron-type charging section that charges the outer circumferential surface of the image holding member 54 with a voltage having the same polarity as the toner through corona discharge by applying a voltage to a wire. In addition, by irradiating the electrified outer circumferential surface of the image holding member 54 with the light beam L based on image data, an electrostatic latent image is formed.

The developing unit 58 contains a developer in which the toner charged with a negative voltage and carrier particles made of for example a magnetic body are mixed, and includes a cylindrical development sleeve 59 which is provided inside a magnetic roller (not shown in the drawing) having plural magnetic poles arranged in the circumferential direction thereof. The developing unit 58 is configured such that a magnetic brush is formed at a portion facing the image holding member 54 by rotating the development sleeve 59.

The developing unit 53 develops the electrostatic latent image on the outer circumferential surface of the image holding member 54 with the toner so as to form a toner image (developer image) by applying a development bias to the development sleeve 59 through a voltage application section (not shown in the drawing). In addition, the developing unit 58 for each color is supplied with each toner from a toner cartridge 88 for each color provided above the image forming section 50.

The cleaning device 60 includes a cleaning blade 61 that comes into contact with the outer circumferential surface of the image holding member 54, and collects the toner remaining on the outer circumferential surface of the image holding member 54 by scraping the toner off through the cleaning blade 61. Further, the intermediate image transfer belt 66, onto which the toner image developed by the developing unit 58 is primarily transferred, is provided downstream of the developing unit 58 in the rotation direction of the image holding member 54.

As shown in FIG. 1, the transfer unit 64 includes: the endless intermediate image transfer belt 66; primary image transfer rollers 68 that primarily transfer the toner images onto the intermediate image transfer belt 66 from the image holding member 54; and a secondary image transfer roller 70 and an auxiliary roller 72 that secondarily transfer the toner images, which are sequentially superposed upon the intermediate image transfer belt 66, onto a sheet of printing paper P.

A driving roller 74, which rotates, and plural driven rollers 76, which are rotatable, are disposed inside the intermediate image transfer belt 60. In addition, the intermediate image transfer belt 66 is wound around the primary image transfer rollers 68Y, 68C, and 68K, the driving roller 14, the driven rollers 76, and the auxiliary roller 72. The intermediate image transfer belt 66 revolves in a counterclockwise rotation direction in the drawing through the rotation of the driving roller 74.

The primary image transfer roller 68 is configured, for example, such that an elastic layer (not shown in the drawing) is provided around a cylindrical shaft thereof made of a metal such as stainless steel, and is rotatable since the both ends of the shaft are supported by bearings. Further, a voltage (positive voltage) having a polarity opposite to a polarity of the toner is applied from a power supply (not shown in the drawing) to the shaft of the primary image transfer roller 68.

The secondary image transfer roller 70 has, for example, the same configuration as the primary image transfer rollers 68, is disposed downstream of the registration roller 38 in the transport path 30, and is configured to be rot a table. The secondary image transfer roller 70 is in contact with a surface (external face) of the intermediate image transfer belt 66 with the intermediate image transfer belt 66 interposed between the auxiliary roller 72 and itself at a secondary image transfer position.

The auxiliary roller 72 is configured such that counter electrodes for the secondary image transfer roller 70 are formed thereon and a secondary transfer voltage (negative voltage) is applied to the roller through a metallic power supply roller (not shown in the drawing) which is disposed to be in contact with an outer circumferential surface of the auxiliary roller 72. The secondary transfer voltage is applied to the auxiliary roller 72 so as to cause an electric potential difference between the auxiliary roller 72 and the secondary image transfer roller 70. Thereby, the toner image on the intermediate image transfer belt 66 is secondarily transferred onto the sheet of printing paper P which is transported to the contact portion between the secondary image transfer roller 70 and the intermediate image transfer belt 66.

A transport belt 78 is provided downstream of the secondary image transfer roller 70. The transport belt 78 transports the sheet of printing paper P, onto which the secondary transfer of the toner image is completed, to the fixing device 80. The transport belt 78 is wound around a supporting roller 46 and a driving roller 48, and revolves to transport the sheet of printing paper P to the fixing device 80.

The fixing device 80 includes: a heating belt mechanism 82 that has a fixing belt 84 which fixes the toner image transferred onto the sheet of printing paper P through heating; and a pressure roller 86 that press the sheet of printing paper P against the fixing belt 84. Consequently, the toner image transferred onto the sheet of printing paper P is fixed onto the sheet of printing paper P by heating and pressing the sheet of printing paper P while transporting the sheet through the fixing belt 84 and the pressure roller 86.

Next, the image reader 100 will be described. As shown in FIG. 1, the image reader 100 includes: an original document platen 102 on which plural sheets of an original document (not shown in the drawing) may be placed; a platen glass 104 on which a single sheet of the original document is loaded; an original document reading section 106 that reads the sheet of the original document loaded on the platen glass 104; and an original document discharging section 108 that discharges the read original document sheet.

As shown in FIG. 2, the original document reading section 106 includes an image reader body 100A as a housing formed of plural frame members and panel members. The image reader body 100A is provided with: a light irradiation section 110 that irradiates the sheet of the original document loaded on the platen glass 104 with light; and one full-rate mirror 112 and two half-rate mirrors 114 that reflect and return reflected light, which is emitted by the light irradiation section 110 and reflected by the sheet of the original document, in a direction parallel to the platen glass 104.

The original document reading section 106 includes: an imaging lens 116 into which the light reflected and returned by the full-rate mirror 112 and the half-rate mirrors 114 is incident; and a photoelectric conversion element 118 that converts the reflected light, which is imaged by the imaging lens 116, into an electrical signal. In addition, the photoelectric conversion element 118, which is disposed to face the imaging lens 116, is provided on a side of a surface of a substrate 120 facing the left side in FIG. 2. Further, an imaging system 128 includes at least the imaging lens 116, and the substrate 120 that has the photoelectric conversion element 118.

As shown in FIG. 2, the image reader 100 is provided above the toner cartridges 88. That is, a panel member (not shown in the drawing), which covers the upper portion of the image forming apparatus body 10A, or the like is not provided between the toner cartridges 88 and the image reader 100, and the image reader 100 is directly disposed on the upper surface side of the toner cartridge 88.

Specifically, in the image reader body 100A, a bottom wall immediately below a portion, in which the substrate 120 is disposed, is formed as a protruding bottom wall 126 that protrudes toward the side below a bottom wall 122 immediately below a portion in which the substrate 120 is not disposed. In addition, the bottom wall 122 and the protruding bottom wall 126 are integrally connected, by a connection wall 124 (refer to FIG. 4).

The protruding bottom wall 126 is disposed between a toner cartridge 88Y and a toner cartridge 88M. The image reader body 100A is directly disposed on the upper surface side of the toner cartridges 88Y, 88M, 88C, and 88K. In addition, the connection wall 124 overlaps with the toner cartridge 88 in the up-down direction. However, a space is present between the toner cartridge 88Y and the toner cartridge 88M, and the space is formed as a housing section 20 that is formed in the image forming apparatus body 10A so as to house the protruding bottom wall 126.

Figure 4:
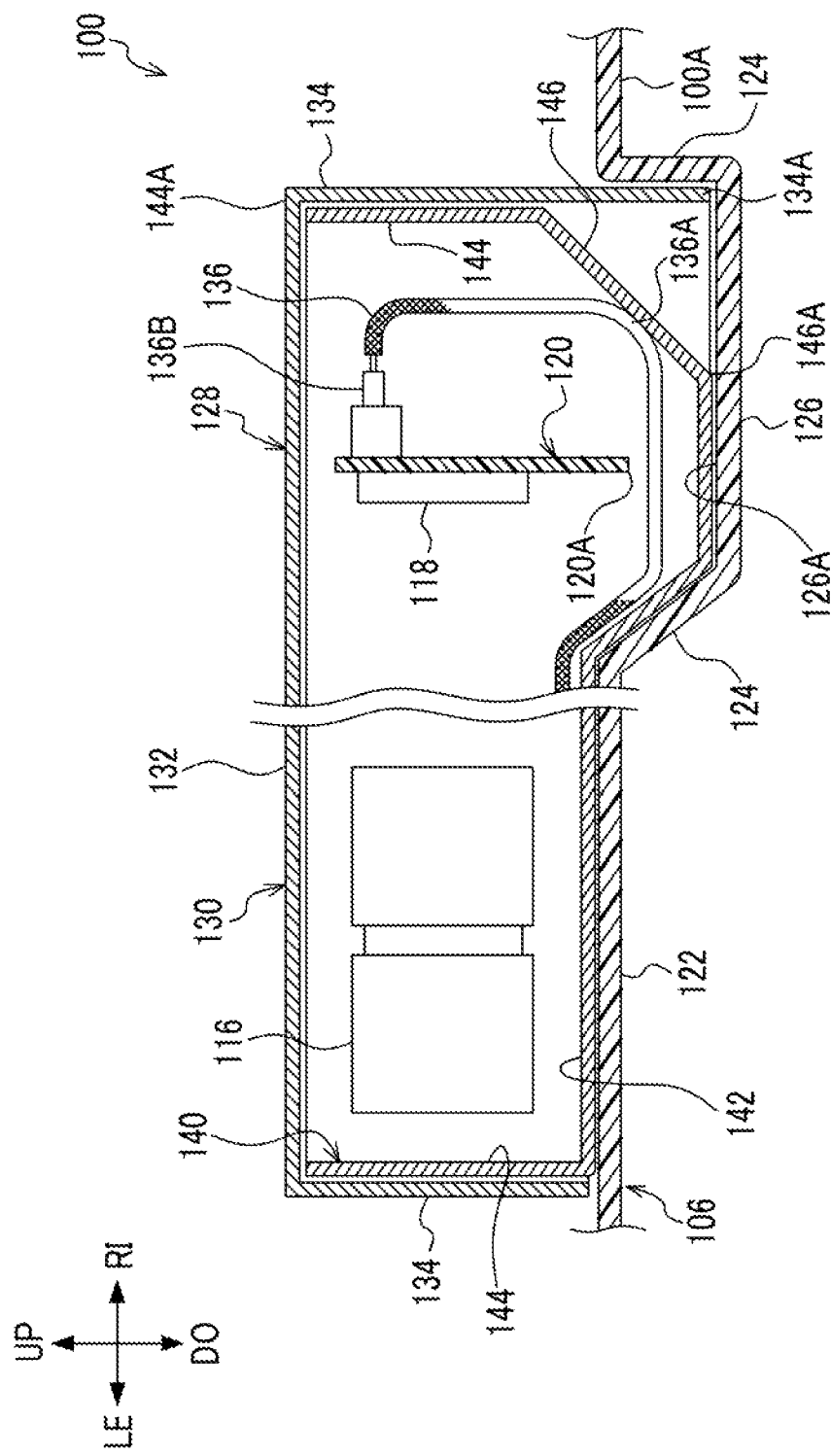
FIG. 4 is a cross-sectional view illustrating main sections of the image reader.

As shown in FIGS. 3 and 4, the substrate 120 is formed in an elongated shape of which the length direction is the longitudinal direction of the apparatus in the present exemplary embodiment. One end 136B of a wire harness 136 and one end 138B of a wire harness 138 as examples of the wire are connected to the upper end of the substrate 120 on the front surface side facing the right side in FIG. 4.

For example, the front side wire harness 136 is for power supply, and the rear side wire harness 138 is for an electrical signal to send the image data. Consequently, the electrical signal, which is converted by the photoelectric conversion element 118, is sent to the image forming apparatus 10 through the rear side wire harness 138, and is subjected to image processing.

The wire harnesses 136 and 138 are respectively folded and returned back so as to pass by the lower sides of the substrate 120. As described above, by making the wire harnesses pass by the lower sides of the substrate 120, the space, which may be formed by the wires, is expanded in the right direction in FIG. 4. As a result, an increase in the width of the image reader 100 is suppressed.

Specifically, the wire harnesses 136 and 138 are returned back to the lower side from the upper end on the side of the surface of the substrate 120 facing the right side in FIG. 4, and are returned back toward the left side of the substrate 120 through a gap between a lower end 120A of the substrate 120 and an earth plate 140 to be described later. With such a configuration, the other ends (not shown in the drawing) of the wire harnesses 136 and 138 are connected to the image forming apparatus 10. As viewed from the longitudinal direction, folded portions 136A and 138A, which are respectively folded in curved shapes (circular arc shapes) or crooked shapes, are formed at the lower end of the wire harnesses 136 and 138 which are positioned on the right of the substrate 120.

As shown in FIGS. 3 and 4, the earth plate 140 is provided inside the image reader body 100A. The earth plate 140 is a metallic conductive housing configured such that a circumferential wall 144 is formed integrally around a bottom wall 142 that has a substantially rectangular plate shape and the top of the housing is open. A portion on the right side (immediately below the substrate 120) of the bottom wall 142 protrudes downward along the connection wall 124 and the protruding bottom wall 126.

As viewed from the longitudinal direction, an inclination wall 146 is integrally formed at the lower end of the circumferential wall 144 of the earth plate 140, which is positioned on the right of the substrate 120, so as to have a length corresponding to the entire apparatus in the longitudinal direction. The inclination wall 146 is an example of the inclination section that is inclined at a predetermined angle to the up-down direction (vertical direction). The folded portions 136A and 138A of the wire harnesses 136 and 138 are constantly in line contact with the inner surface of the inclination wall 146, in the width direction of the wire harnesses 136 and 138, due to their own weight.

That is, the wire harnesses 136 and 138 are constantly grounded to the portion where the earth plate 140 is inclined. In addition, as shown in FIG. 4, the imaging lens 116 is mounted on the upper surface in the center in the longitudinal direction, on the left side portion of the bottom wall 142 of the earth plate 140. The optical axis of the imaging lens 116 is set in the left-right direction.

A metallic (conductive) cover member 130 is provided on the outside of the earth plate 140. The cover member 130 is a housing which is configured such that a circumferential wall 134 is formed integrally around a top wall 132 having a rectangular plate shape and which is open on the lower side. The cover member 130 is formed to be larger than the earth plate 140. Accordingly, the cover member 130 is a cover of the earth plate 140, and is configured to cover the earth plate 140, the wire harnesses 136 and 138, the substrate 120, and the like.

Specifically, a top surface 144A of the circumferential wall 144 of the earth plate 140 is configured to be in contact with an inner surface of the top wall 132 of the cover member 130. In addition, the surfaces do not necessarily have to be in contact with each other, and may be supported by a different portion. A lower end 134A of the circumferential wall 134 of the cover member 130 extends up to the position at the height substantially the same as that of a lower end 146A of the inclination wall 146 of the earth plate 140.

The circumferential wall 144 of the earth plate 140 and the circumferential wall 134 of the cover member 130 constitute a so-called labyrinth structure. In the structure, a path, through which electromagnetic wave noise passes, is complicated such that the electromagnetic wave noise is not linked through a straight line to other portions when the electromagnetic wave noise occurs.

The lower end 146A of the inclination wall 146 of the earth plate 140 and the lower end 134A of the circumferential wall 134 of the cover member 130 extend to the side below the bottom wall 122. That is, the lower end 146A of the inclination wall 146 and the lower end 134A of the cover member 130 extend up to a position at which the ends come into contract with a bottom surface 126A of the protruding bottom wall 126. Thereby, the circumferential wall 134 of the cover member 130 and the connection wall 124 constitute a labyrinth structure, and the entire labyrinth structure is complicated.

In the image forming apparatus 10 having the image reader 100 with the above-mentioned configuration, mainly an effect of a ground structure of the wire harnesses 136 and 138 will be hereinafter described.

When a sheet of an original document is intended to be copied (or scanned), the sheet of the original document is placed on the original document platen 102 of the image reader 100, or is placed on the platen glass 104, and copying is started by operating an operation panel which is not shown in the drawing. That is, the sheet of the original document is read by the original document reading section 106. Then, the read image data is sent to the main operation section 16.

Then, the outer circumferential surface of each image holding member 54 is charged by each charging unit 56, and is exposed to the light beam L which is emitted from each exposure unit 62 in accordance with the sent image data. Thereby, an electrostatic latent image is formed on the outer circumferential surface of each image holding member 54. Then, the electrostatic latent images formed on the outer circumferential surfaces of the respective image holding members 54 are developed as toner images with the respective colors of yellow (Y), magenta (M), cyan (C), and black (K) by the respective developing units 58.

Subsequently, the respective toner images formed on the outer circumferential surfaces of the respective image holding members 54 are sequentially transferred onto the intermediate image transfer belt 66 by the respective primary image transfer rollers 68 at the primary transfer position. Then, the toner images, which are multiply transferred onto the intermediate image transfer belt 66, are secondarily transferred onto the front surface of the sheet of printing paper P, which is transported through the transport path 30, by the secondary image transfer roller 70 and the auxiliary roller 72, at the secondary image transfer position.

The sheet of printing paper P having the front surface, onto which the toner images are transferred, is transported toward the fixing device 80 by the transport belt 78. Then, the fixing device 80 heats and presses the toner images on the surface of the sheet of printing paper P. Thereby, the toner images are fixed onto the surface of sheet of printing paper P. The sheet of printing paper P, onto which the toner images are fixed, is discharged to the sheet discharge section 28. In such a manner, a series of a process of forming images is completed.

In a case where the toner images are formed on the rear surface of the sheet of printing paper P on which no image has been formed (in a case of duplex printing), the sheet of printing paper P having the front surface, onto which the toner images are fixed, is delivered to the duplex transport path 40. Then, the sheet of printing paper P is transported again to the feed rollers 36 through the duplex transport path 40, and the toner images are transferred onto the rear surface thereof at the secondary image transfer position. The toner images on the sheet of printing paper P having the rear surface, onto which the toner images are transferred, are fixed by the fixing device 80, and thereafter the sheet is discharged to the sheet discharge section 28.

Here, as shown in FIGS. 3 and 4, each of one ends 136B and 138B of the wire harnesses 136 and 138 is connected to the upper end of the substrate 120 that has the photoelectric conversion element 118. In addition, each of the folded portions 136A and 138A of the wire harnesses 136 and 138 is constantly in linear contact with the inner surface of the inclination wall 146 of the earth plate 140.

That is, the folded portions 136A and 138A of the wire harnesses 136 and 138 are constantly grounded to anywhere on the inner surface of the inclination wall 146 without being separated from the inner surface, due to their own weight, even when there are errors respectively in the lengths of the wire harnesses 136 and 138 or in position adjustment of the substrate 120, which has the photoelectric conversion element 118, relative to the imaging lens 116 in the left-right direction in FIG. 4. Consequently, the electromagnetic wave noise caused by the wire harnesses 136 and 138 is reduced.

The cover member 130 is provided on the outside of the earth plate 140. The circumferential wall 144 of the earth plate 140 and the circumferential wall 134 of the cover member 130 constitute the labyrinth structure. That is, the top surface 144A of the circumferential wall 144 of the earth plate 140 is in contact with the inner surface of the top wall 132 of the cover member 130, and the lower end 134A of the circumferential wall 134 of the cover member 130 extends up to the position at the height substantially the same as that of the lower end 146A of the inclination wall 146 of the earth plate 140.

Accordingly, the electromagnetic wave noise, which is caused by the wire harnesses 136 and 138 and is reduced by the earth plate 140, is attenuated by the labyrinth structure.

That is, with such a configuration, the electromagnetic wave noise, which is caused by the wire harnesses 136 and 138 and leaks to the outside of the image reader 100, is reduced.

In a similar manner to the present exemplary embodiment, the lower end 146A of the inclination wall 146 of the earth plate 140 and the lower end 134A of the circumferential wall 134 of the cover member 130 extend to the side (up to the position at which the ends come info contact with the bottom surface 126A of the protruding bottom wall 126) below the bottom wall 122. In this case, the labyrinth structure is complicated by the connection wall 124 which is connected integrally around the protruding bottom wall 126. Hence, the electromagnetic wave noise, which is caused by the wire harnesses 136 and 133 and leaks to the outside of the image reader 100, is further reduced.

As shown in FIG. 2, a panel member or the like is not provided between the image reader body 100A and the image forming apparatus body 10A. In addition, the protruding bottom wall 126 of the image reader body 100A is disposed on the housing section 20 between the toner cartridge 88Y and the toner cartridge 38M.

Consequently, by achieving an increase in the speed of image formation, an increase in the image quality of the image, and an increase in the life of the consumables, a region of the main operation section 16 is expanded. Even in this case, compared with the configuration where the panel member is provided between the image reader body 100A and the image forming apparatus body 10A, an increase in the height of the image reader 100 from the floor is suppressed or prevented.

That is, an increase in the speed of image formation and the like are achieved without impairing operability for the image reader 100. In the configuration, the panel member or the like is not provided between the image reader body 100A and the image forming apparatus body 10A. Hence, compared with the configuration where the panel member is provided, there is an advantage in achieving reduction in the manufacturing costs.

The above description has been given of the image reader 100 and the image forming apparatus 10 according to the present exemplary embodiment, based on the drawings. However, the image reader 100 and the image forming apparatus 10 according to the present exemplary embodiment are not limited to the examples shown in the drawings, and may be appropriately modified in design without departing from the scope of the present invention.

For example, the inclination wall 146 of the earth plate 140 may be configured to be formed on only both ends thereof in the longitudinal direction with which the folded portions 136A and 138A of the wire harnesses 136 and 138 come into linear contact, and the earth plate 140 is not limited to the shape shown in the drawings. Further, the number of the wire harnesses 136 and 138 is not limited to two as shown in the drawings.

The wire harnesses 136 and 138 may be folded toward the right side in FIG. 4 without passing the lower side of the substrate 120, and the inclination wall 146 may be brought into contact with the folded portions. With such a configuration, it may be possible to minimize the height of the original document reading section 106. Further, when the wire harnesses 136 and 138 are brought into contact with the inclination wall 146, the wire harnesses 136 and 138 may be pulled back and turned back through the outside of the cover member 130 without being further folded. Furthermore, as an example of the grounding portion, only the inclination wall 146 may be made of metal and be grounded through the metal, and the other portions may be made of plastic.

The present exemplary embodiment is not limited to a so-called CCD type where the substrate 120, on which the photoelectric conversion element 118 is disposed, is fixed. The present exemplary embodiment may be applied to a so-called CIS type where the substrate 120, on which the photoelectric conversion element 118 is disposed, is moved along the sheet of the original document. In that case, in a case where a stationary original document is read, the substrate 120, on which the photoelectric conversion element 118 is disposed, itself is moved when the stationary original document is read. Therefore, the grounding portion may be provided on the immovable portion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reader comprising:
    a substrate that includes a photoelectric conversion element which is disposed to face an imaging lens;
    a wire that has one end connected to the substrate; and
    a conductive inclination section that is inclined with respect to an up-down direction of the substrate and grounds a folded portion of the wire, the folded portion including a circular arc that is in direct contact with the conductive inclination section.

2. The image reader according to claim 1, wherein the wire is folded to pass by a lower side of the substrate.

3. The image reader according to claim 2, wherein a conductive cover member, that covers the inclination section, the wire, and the substrate, is provided on the outside of the inclination section.

4. The image reader according to claim 3, wherein a lower end of the cover member extends up to a lower end of the inclination section.

5. The image reader according to claim 4, wherein a portion of a bottom wall of an image reader body, in which the substrate is disposed, is formed to protrude toward a side below the other portion of the bottom wall, and
    the lower end of the inclination section and a lower end of the cover member extend toward the side below the other portion of the bottom wall.

6. The image reader according to claim 3, wherein a portion of a bottom wall of an image reader body, in which the substrate is disposed, is formed to protrude toward a side below the other portion of the bottom wall, and
    a lower end of the inclination section and a lower end of the cover member extend toward the side below the other portion of the bottom wall.

7. The image reader according to claim 1, wherein a CCD type where the substrate, on which the photoelectric conversion element is disposed, is fixed is applied.

8. The image reader according to claim 1, wherein the substrate and the one end of the wire are immovable.

9. An image reader comprising:
a substrate that includes a photoelectric conversion element which is disposed to face an imaging lens;
a wire that has one end connected to the substrate; and
a conductive inclination section that is inclined with respect to an up-down direction of the substrate and grounds a folded portion of the wire, wherein
a conductive cover member, that covers the inclination section, the wire, and the substrate, is provided on the outside of the inclination section.

10. The image reader according to claim 9, wherein
a lower end of the cover member extends up to a lower end of the inclination section.

11. The image reader according to claim 10, wherein
a portion of a bottom wall of an image reader body, in which the substrate is disposed, is formed to protrude toward a side below the other portion of the bottom wall, and
the lower end of the inclination section and a lower end of the cover member extend toward the side below the other portion of the bottom wall.

12. The image reader according to claim 9, wherein
a portion of a bottom wall of an image reader body, in which the substrate is disposed, is formed to protrude toward a side below another portion of the bottom wall, and
a lower end of the inclination section and a lower end of the cover member extend toward the side below the other portion of the bottom wall.

13. An image forming apparatus comprising:
the image reader according to claim 12; and
a housing section that is formed on an image forming apparatus body to house a protruding bottom wall.

14. An image reader comprising:
a substrate that includes a photoelectric conversion element for reading an original document image;
a folded wire that has one end connected to the substrate; and
a conductive inclination section that is inclined with respect to a vertical direction and is in direct contact with a circular arc that is on a folded portion of the wire.

15. The image reader according to claim 14, wherein
another end of the wire moves along the original document image, which is stationary, in order to read the original document image, and
the inclination section is provided on the one end of the wire which is immovable.

16. An image reader comprising:
a substrate including a photoelectric conversion element;
a wire having one end connected to the substrate, the wire being pulled around to a lower side from the one end and having a curve-shaped portion that is formed at a lower end; and
a conductive section that protrudes more downward in the lower side than the substrate,
wherein the curve-shaped portion of the wire forms a circular arc, which is in direct contact with the conductive section.

17. The image reader according to claim 16, wherein
the substrate is arranged in parallel to a vertical direction, and
the conductive section protrudes downward immediately below the substrate.

18. The image reader according to claim 17, wherein
the curve-shaped portion of the wire is formed lower than the substrate.

19. The image reader according to claim 17, wherein
the wire is in contact with the conductive section due to a weight of the wire.

20. The image reader according to claim 17, wherein
an imaging lens is disposed to face the substrate, and
a portion of the conductive section protrudes lower than where the imaging lens is disposed.

21. The image reader according to claim 16, wherein
the curve-shaped portion of the wire is formed lower than the substrate.

22. The image reader according to claim 16, wherein
the wire is in contact with the conductive section due to a weight of the wire.

23. The image reader according to claim 16, wherein
an imaging lens is disposed to face the substrate, and
a portion of the conductive section protrudes lower than where the imaging lens is disposed.

* * * * *